Oct. 27, 1925.  
H. H. DAHL  
1,558,465
LAWN MOWER
Filed April 6, 1923
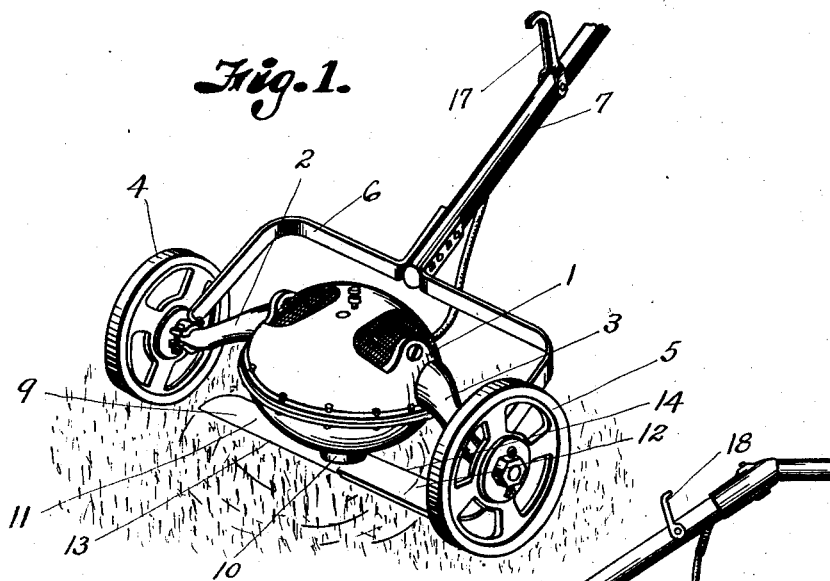
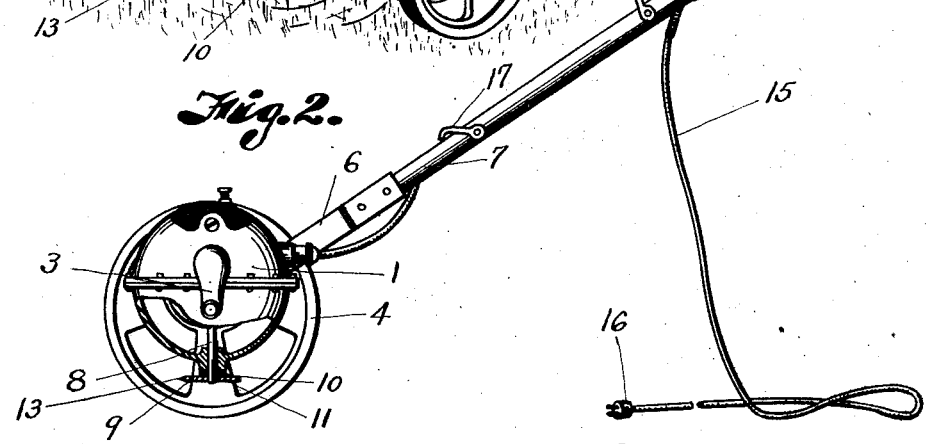
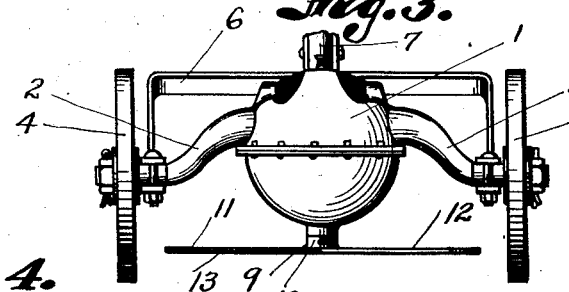
INVENTOR  
Herbert H. Dahl.  
BY  
ATTORNEY Patented Oct. 27, 1925.

1,558,465

UNITED STATES PATENT OFFICE.

HERBERT H. DAHL, OF KANSAS CITY, MISSOURI.

LAWN MOWER.

Application filed April 6, 1923. Serial No. 630,268.

*To all whom it may concern:*

Be it known that I, HERBERT H. DAHL, a citizen of the United States, residing at Kansas City, in the county of Jackson and State of Missouri, have invented certain new and useful Improvements in Lawn Mowers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to lawn mowers and the primary object thereof is to provide an electrically driven lawn mower which may receive its electrical energy from a commercial line, the driving parts being effective in rotating a horizontal, double-edged knife movable about a vertical axis so that the cutting edges may sever the grass. The lawn mower will be manually propelled, however, in the usual way.

The novel construction of the invention will be apparent by reference to the following description in connection with the accompanying drawings, in which Fig. 1 is a perspective view of a lawn mower constructed in accordance with my invention.

Fig. 2 is a side elevational view of the same, the motor case being shown partly in section.

Fig. 3 is a front, elevational view of the lawn mower, and

Fig. 4 is a detail, perspective view of the cutting knife.

The carriage for the lawn mower consists of a motor casing 1 having diametrically oppositely disposed axles 2 and 3, on which are mounted the wheels 4 and 5. Carried by the axle members 2 and 3 is a yoke-shaped frame 6, to which is fastened a handle 7, by means of which the mower can be moved over the ground.

The motor casing 1 carries a motor of usual construction, having a driving shaft 8 movable about a vertical axis. On the lower end of the motor shaft is a cutting knife 9 comprising a collar 10 and two oppositely disposed blades 11 and 12. The respective blades have cutting edges 13 and 14 so that when the knife is rotated, the cutting edges 13 and 14 may sever the grass.

The motor may receive its energy from a commercial line through the conductor 15 having the usual plug 16 thereon to be received in the ordinary house socket.

The pivoted fingers 17 and 18 constitute a reel upon which the conductors 15 may be wound when the mower is not in use.

What I claim and desire to secure by Letters Patent is:

In a lawn mower, a motor housing, separate axle members fixed to and extending from opposite sides of the housing, wheels and a handle frame on the axle members, a handle on the frame, a motor in the housing having a vertical shaft extending below the housing, a knife on the shaft comprising oppositely disposed blades, and means for supplying current to the motor.

In testimony whereof I affix my signature.

HERBERT H. DAHL.